United States Patent
Watson et al.

(10) Patent No.: US 6,998,979 B1
(45) Date of Patent: Feb. 14, 2006

(54) LOCAL AREA POSITIONING SYSTEM SLAVE RECEIVER

(75) Inventors: Mitchell L. Watson, Clackamas, OR (US); Victor B. Numbers, Portland, OR (US)

(73) Assignee: WCR Company, Portland, OR (US)

( * ) Notice: Subject to any disclaimer, the term of this patent is extended or adjusted under 35 U.S.C. 154(b) by 0 days.

(21) Appl. No.: 11/084,079

(22) Filed: Mar. 16, 2005

Related U.S. Application Data

(63) Continuation-in-part of application No. 10/664,809, filed on Sep. 16, 2003.

(60) Provisional application No. 60/554,002, filed on Mar. 16, 2004.

(51) Int. Cl.
*G08B 1/08* (2006.01)

(52) U.S. Cl. .................. 340/539.13; 455/311; 455/313

(58) Field of Classification Search ............ 340/539.1, 340/870.4, 572.7; 455/130, 132, 136, 138, 455/227, 311, 313
See application file for complete search history.

(56) References Cited

U.S. PATENT DOCUMENTS

| | | | |
|---|---|---|---|
| 5,802,463 A | * | 9/1998 | Zuckerman .................. 455/208 |
| 6,366,622 B1 | * | 4/2002 | Brown et al. ................ 375/322 |
| 6,385,268 B1 | * | 5/2002 | Fleming et al. ............. 375/377 |
| 6,812,824 B1 | * | 11/2004 | Goldinger et al. ......... 340/10.1 |

* cited by examiner

*Primary Examiner*—Daryl C Pope
(74) *Attorney, Agent, or Firm*—Marger Johnson & McCollom, P.A.

(57) ABSTRACT

The local area positioning system (LAPS) slave receiver is an extremely sensitive, ultra low noise, high speed up-converting microwave receiver operating in the 900 Mhz to 1.6 Ghz frequency range and is designed for use with a positioning system. The receiver, which may include fiber optic links, allows detection and switching of high speed short duration pulses used to control an associated highly stable 1.0 Ghz start/stop event counter. The receiver, in combination with the counter, is capable of measuring RF propagation distances with an accuracy of 12 inches.

1 Claim, 1 Drawing Sheet

SLAVE RECEIVER BLOCK DIAGRAM

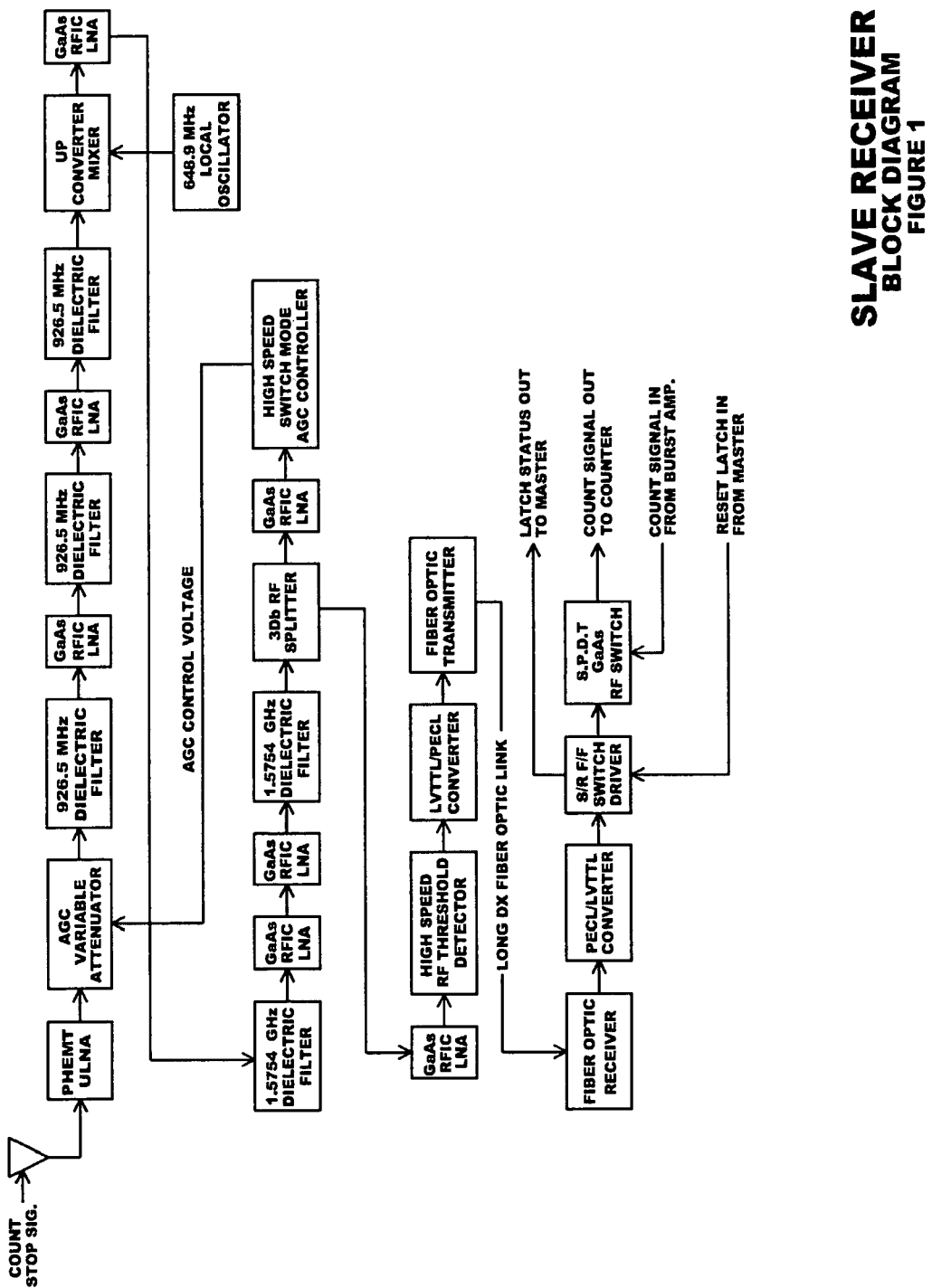

LOCAL AREA POSITIONING SYSTEM SLAVE RECEIVER

CROSS-REFERENCE TO RELATED APPLICATION(S)

The present application is a continuation-in-part of and claims priority to U.S. Ser. No. 10/664,809, filed on Sep. 16, 2003 and further claims priority to U.S. Provisional Patent Application Ser. No. 60/554,002, filed on Mar. 16, 2004. The disclosures of both applications are incorporated by reference herein for all purposes.

BACKGROUND OF THE INVENTION

The present invention is related to the field of positioning systems, and more specifically to a receiver structured for use in a local-area positioning system.

Monitoring the location of a person or subject has been limited to "electronic monitoring" using a radio frequency transmitter attached to a subject. The transmitter communicates to a field monitoring device (FMD), which in turn communicates with a central data base system. FMD systems can report when the subject is within a hundred feet of the FMD, as described in U.S. Pat. No. 4,918,432. Once the subject leaves the immediate area of the FMD, the location of the subject is unknown.

Other techniques for locating a subject at a predetermined area utilizes the combination of caller identification and voice recognition, such as that disclosed in U.S. Pat. No. 5,170,426; using global positioning system (GPS) satellites; or by polling the subject's portable tracking apparatus by placing a cellular phone call to the apparatus as disclosed in U.S. Pat. No. 5,461,390.

These location techniques are limited in the ability to locate the subject as they move about, are costly to procure and operate due to frequent wireless radio frequency (RF) communications. Moreover, such systems generally provide poor spatial resolution. The resolution of commercially available non-military GPS-based systems is thirty feet.

Recently, a low power, all body worn tracking apparatus was described. This device, while significantly reducing size, weight, and power costs associated with tracking a subject, still incurs size, weight and power associated with wireless radio frequency (RF) communications in a wide area wireless infrastructure.

Clearly, size, weight and power are critical requirements for any body worn locating device. Recent technology described above affords the ability to combine the elements into a wristwatch form factor to provide an all body worn location recording device.

There exists a need to implement a location recording apparatus for the purpose of recording a subject's movements, such as an ambulatory patient, emergency personnel in a building, and the like. Active and passive tracking systems described in U.S. Pat. No. 5,731,757, having a single body-worn, tamper-resistant active tracking apparatus, are not required to simply record the locations of a mobile subject.

BRIEF DESCRIPTIONS OF THE DRAWINGS

FIG. 1 is a block diagram of the local area positioning system slave receiver as described herein.

DETAILED DESCRIPTION OF PREFERRED EMBODIMENT(S)

The local area positioning system (LAPS) slave receiver is an extremely sensitive, ultra low noise, high speed up-converting microwave receiver operating in the 900 Mhz to 1.6 Ghz frequency range. It is designed for use with a positioning system, such as the local area positioning system of co-pending U.S. Ser. No. 10/664,809. The unique design of the receiver, including fiber optic links, allows for the detection and switching of high speed short duration pulses used to control an associated highly stable 1.0 Ghz start/stop event counter. The receiver, in combination with the counter, is capable of measuring RF (Radio Frequency) propagation distances with an accuracy of 12 inches.

Turning to FIG. 1, one embodiment of the LAPS slave receiver is an up-converting single conversion receiver with a preferred signal input having an exemplary frequency of 926.5 Mhz. The input signal can be up-converted to a frequency of 1.5754 Ghz to maintain the high switching and accuracy required for counter control. Conventional down-converting is not used in order to maintain high speed accuracy, and direct conversion is not used to prevent instability.

A combination of psuedomorphic high electron mobility transistor (PHEMT) and gallium-arsenide (GaAs) devices preferably are utilized to maintain the ultra low noise high speed requirements of the receiver. Signal selectivity (rejection of unwanted signals) can be provided by the use of dielectic filters throughout the receiver, although other filtering methods can be efficaciously employed.

An input (counter stop) signal to the receiver initially can be amplified by an ultra low noise PHEMT field effect transistor (FET) that can provide approximately 17 db of gain. The signal then can be passed through a 926.5 Mhz dielectric filter for selectivity and an automatic gain control (AGC) variable attenuator. The AGC circuitry provides for constant signals levels through the receiver and constant signal level detection regardless of the strength of the incoming received signal. Prior to up-conversion, an additional 34 db of gain can be provided by two stages of GaAs low noise amplifiers in combination with 926.5 Mhz dielectric filters.

The amplified 926.5 Mhz signal then can be passed through a high frequency up-converting mixer, where it is mixed with a highly stable 648.9 Mhz local oscillator to produce a 1.5754 Ghz IF (intermediate frequency). This 1.5754 Ghz IF signal preferably is amplified an additional 60 db and additional selectivity provided by three stages of low noise GaAs amplifiers in combination with 1.5754 dielectric filters.

The high level 1.5754 Ghz IF pulse signal can be passed through a two-way splitter to a GaAs stage of amplification and a high speed switch mode AGC controller. Output voltage from the AGC controller is utilized to control the overall gain of the receiver through the AGC variable attenuator. The 1.5754 Ghz IF pulse from the two-way splitter is also passed through a separate GaAs stage of amplification and is detected by a very high speed Shottky diode detector. The direct current (DC) output from the Shottky detector then can be passed through a very sensitive data slicer/comparator. The Data Slicer/Comparator combination is used because it is capable of detecting very low DC levels above a reference threshold and thereby provide extremely sensitive detection.

Output from the data slicer/comparator can be converted from low voltage transistor to transistor logic (LVTTL) to positive emitter coupled logic (PECL). The LVTTL/PECL conversion is required for compatibility with a fiber optic transmitter that is preferably used to transmit the detected counter control pulse to a distant remote second detector. The LAPS receiver is very unique in this situation in that it preferably uses fiber optics rather than the more typical wire method of interconnecting stages. This allows the second detector stage to be located at long distances from the receiver without the resulting loss of pulse speed and accuracy that would be inherent with typical wire connections. A wireless radio-frequency (RF) link can also be used in place of the fiber optic link, but fiber optics provides for greater simplicity and reduced cost compared to the necessary RF components for a wireless link.

The LAPS receiver fiber optic transmitter converts the PECL counter control signal to a light pulse and transmits it to an associated fiber optic receiver. The fiber optic receiver can be located up to two miles from an associated transmitter without negatively affecting signal integrity. The PECL output from the fiber optic receiver is then processed by a PECL/LVTTL converter where it is converted back to TTL levels that can be used by a GaAs high speed Single Pole Double Throw (SPDT) switch.

The SPDT switch provides the STOP control for the 1.0 Ghz counter. It is this counter that provides a differential RF propagation measurement with a theoretical accuracy of 1 foot.

A person skilled in the art will be able to practice the present method in view of the description present in this document, which is to be taken as a whole. While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and sub-combinations of the various elements, features, functions and/or properties disclosed herein.

What is claimed is:

1. A local area positioning receiver, comprising:
   a filter configured to accept an input signal including signal components having frequencies in the range of about 900 MHZ to 1 GHz and attenuate signal components having frequencies less than about 900 MHZ and greater than about 1 GHz to output a filtered signal;
   a mixing amplifier structured to amplify the filtered signal and mix it with a stable mixing signal to produce an intermediate frequency mixed signal;
   a splitter structured to divide the intermediate frequency mixed signal into a first mixed sub-signal and a second mixed sub-signal;
   an automatic gain control unit controller coupled to the splitter and structured to receive the first mixed sub-signal;
   a GaAs amplifier coupled to the splitter and structured to amplify the second mixed sub-signal to produce an amplified second mixed sub-signal;
   a Shottky diode detector coupled to the GaAs amplifier and structured to receive the amplified second mixed sub-signal and produce a corresponding direct-current detector output signal;
   a data slicer/comparator operative to receive the detector output signal and produce a corresponding low-voltage transistor-to-transistor logic signal; and
   a GaAs single-pole double throw switch structured to be actuated by the low-voltage transistor-to-transistor logic signal at a frequency of about 1 GHz.

* * * * *